United States Patent
Troutman et al.

(10) Patent No.: US 6,806,884 B2
(45) Date of Patent: Oct. 19, 2004

(54) TECHNIQUE FOR FILLING A REGION OF MEMORY USING MULTIPLE REGION FILL PROCESSORS

(75) Inventors: Roy Troutman, Fort Collins, CO (US); Calvin Selig, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 121 days.

(21) Appl. No.: 09/963,226

(22) Filed: Sep. 25, 2001

(65) Prior Publication Data

US 2003/0063091 A1 Apr. 3, 2003

(51) Int. Cl.[7] .............................................. G09G 5/399
(52) U.S. Cl. ...................................... 345/540; 345/505
(58) Field of Search ................................ 345/628, 501, 345/530, 561, 540, 418, 419, 426, 502, 505, 544

(56) References Cited

U.S. PATENT DOCUMENTS

| | | | | |
|---|---|---|---|---|
| 5,752,260 A | * | 5/1998 | Liu | 711/129 |
| 6,239,812 B1 | * | 5/2001 | Pettazzi et al. | 345/648 |
| 6,477,281 B2 | * | 11/2002 | Mita et al. | 382/248 |
| 6,480,201 B1 | * | 11/2002 | Fushiki et al. | 345/592 |
| 2002/0105522 A1 | * | 8/2002 | Kolluru et al. | 345/519 |

* cited by examiner

Primary Examiner—Kee M. Tung
(74) Attorney, Agent, or Firm—Kevin M. Hart

(57) ABSTRACT

A technique for filling a memory area that represents a rectangle. The rectangle or a first section thereof may be divided into i+j horizontal subsections. The i horizontal subsections may be filled in a first pass using i region fill processors. And the j horizontal subsections may be filled in a second pass using j region fill processors. A second section of the rectangle may be filled by dividing the second section into n vertical subsections having equal width and filling the n vertical subsections using n region fill processors.

44 Claims, 2 Drawing Sheets

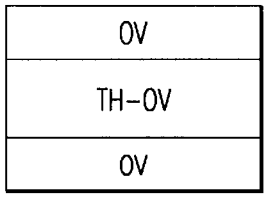
FIG. 5
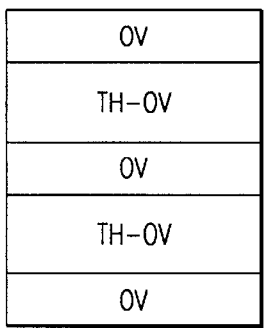
FIG. 6
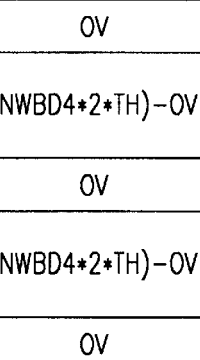
FIG. 8
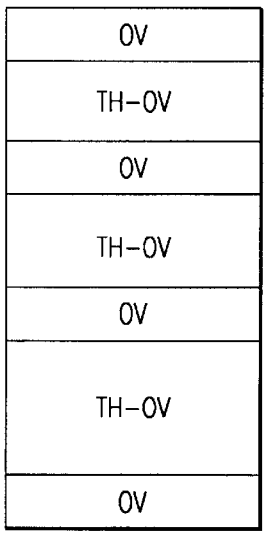
FIG. 7
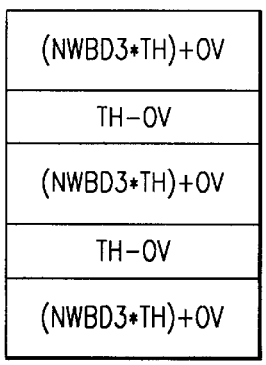
FIG. 10
FIG. 9
FIG. 11
FIG. 12

TECHNIQUE FOR FILLING A REGION OF MEMORY USING MULTIPLE REGION FILL PROCESSORS

FIELD OF THE INVENTION

This invention relates to methods and apparatus for performing fill operations within regions of computer memory.

BACKGROUND

In the field of computing, it is frequently necessary to fill a large number of memory locations with a value. For example, in the field of computer graphics, it is common to fill a region of a frame buffer memory with a default value such as a background color value.

Performance is an issue when executing a fill operation because of the large number of memory locations that must be written during the operation: It is desirable to complete the fill as quickly as possible. One prior art technique that has been employed in this area has been to provide an automatic fill feature in memory controller hardware. The typical manner of using such a feature is for driver software to "set up" a fill operation by writing a starting location, a region size/shape, and a fill value into one or more registers of the memory controller hardware. Once the driver software has provided this set-up information, the memory controller hardware may then perform the fill operation for the region of interest autonomously without further involvement by the driver software. While the prior art technique provides some speed enhancement during fill operations, it is desirable to provide an even greater speed enhancement.

SUMMARY OF THE INVENTION

In one general aspect, the invention includes a method or apparatus for filling a memory area that represents a rectangle. The rectangle or a first section thereof may be divided into i+j horizontal subsections. The i horizontal subsections may be filled in a first pass using i region fill processors. And the j horizontal subsections may be filled in a second pass using j region fill processors.

In another general aspect, the i subsections may have a first common size, and the j subsections may have a second common size. If so, then the hardware of the region fill processors and the setup of such hardware may be simplified.

In another general aspect, a second section of the rectangle may be filled by dividing the second section into n vertical subsections having equal width, and filling the n vertical subsections using n region fill processors.

BRIEF DESCRIPTION OF THE DRAWINGS

FIGS. 5–12 are block diagrams illustrating a second technique for filling the region of FIG. 2 or a section thereof according to a preferred embodiment of the invention.

DETAILED DESCRIPTION OF THE PREFERRED EMBODIMENTS

Figure 1:
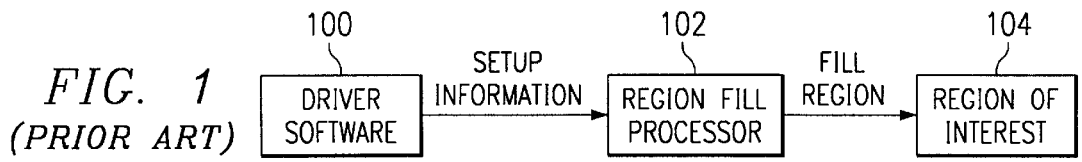
FIG. 1 is a block diagram illustrating a prior art technique for filling a region of memory.

FIG. 1 illustrates a prior art technique for filling a region of memory. Region of interest 104 may be any region of memory representing a rectangle. For example, region 104 may be a rectangle within a frame buffer memory of a computer graphics system. Driver software 100 fills region 104 by writing setup values into the registers of a region fill processor 102. Region fill processor 102 is known in the art and typically takes the form of a memory controller or a state machine within a memory controller. To accomplish the fill operation, driver software 100 writes values into registers of processor 102 to indicate the location and dimensions of region 104, as well as the value to be written into the region. Once the setup information has been written, region fill processor 102 may fill region 104 autonomously, without further direction from driver software 100.

Figure 2:
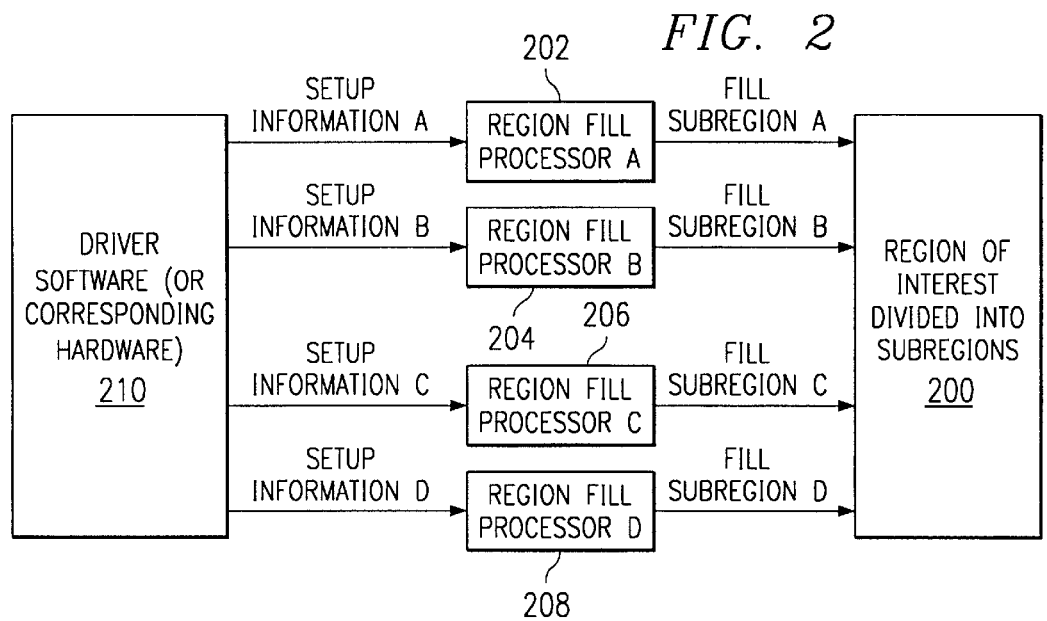
FIG. 2 is a block diagram illustrating, in a general manner, a technique for filling a region of memory according to a preferred embodiment of the invention.

FIG. 2 illustrates, in a general manner, a technique for filling a region of memory according to a preferred embodiment of the invention. Rather than use a single region fill processor 102 to fill the region of interest as a single rectangle, driver software 210 may subdivide region of interest 200 into several subregions. Numerous region fill processors 202–208 may then be used to fill the subregions either simultaneously or in passes. To do so, driver software 210 writes setup information for subregion A into region fill processor 202, setup information for subregion B into processor 204, and so on. Because of parallelism, a performance enhancement may be achieved in this manner relative to the prior art. As it happens, however, obtaining maximum performance while attempting to use more than one region fill processor for this purpose is a difficult problem. The remainder of this discussion will focus, therefore, on how best to achieve maximum performance while filling region 200 with up to four region fill processors.

Figure 3:
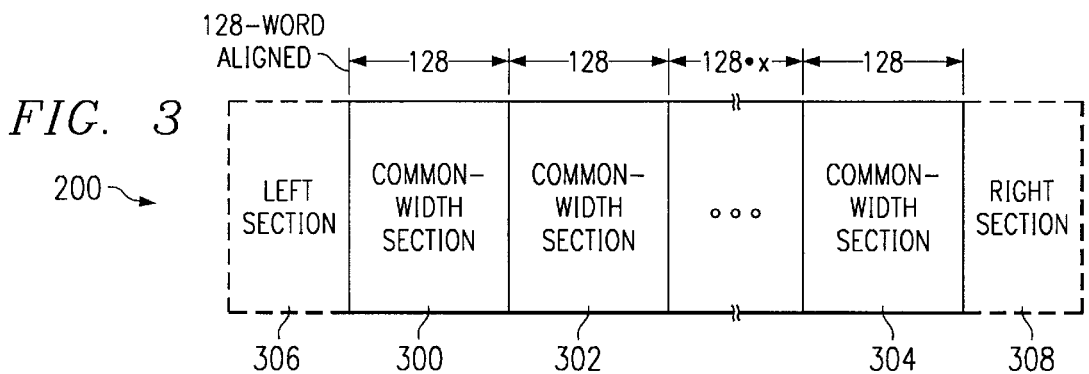
FIG. 3 is a block diagram illustrating the region of interest of FIG. 2 in more detail.

Assume that region 200 represents a rectangle. The inventors hereof have discovered that it is advantageous to divide the rectangle into vertical sections, as shown in FIG. 3. Where possible, the rectangle may be divided into one or more vertical sections 300–304 having a predetermined common width. Because the overall width of rectangle 200 may not be an even multiple of the common width, one or more arbitrary-width vertical sections may also be defined to complete the subdivision of rectangle 200. In the drawing, two such arbitrary-width vertical sections 306 and 308 are shown.

In general, an arbitrary-width section can be placed anywhere between the common-width sections to complete the subdivision of rectangle 200. But the inventors hereof have discovered that, with some hardware, performance benefits may be obtained by aligning the vertical boundaries of the common width sections with certain absolute memory addresses. For example, in the Visualize FX5 and FX10 series graphics systems sold by Hewlett-Packard Company, the region fill processors yielded their best performance when the common-width sections were 128-word aligned. Preferably, therefore, the left vertical boundary of section 300 may be placed at the left-most 128-word aligned address that occurs inside region 200. Unless the left edge of rectangle 200 happens to coincide with this address, such a placement of section 300 will yield an arbitrary-width section 306 on the left side of rectangle 200. As many common-width sections as possible may be defined contiguously with section 300 and, depending on the size of rectangle 200, a second arbitrary-width section 308 may be defined on the right side of rectangle 200 to complete the subdivision of the rectangle into vertical sections.

If rectangle 200 is subdivided into one or more vertical sections as described above, the common-width vertical sections are preferably filled using a vertical technique, and any arbitrary-width vertical sections are preferably filled using a horizontal technique, both of which techniques will now be described. (Note, however, that the horizontal technique may optionally be employed to fill the entire rectangle 200 or all of the sections thereof whether the sections be common-width sections or arbitrary-width sections.)

Figure 4:
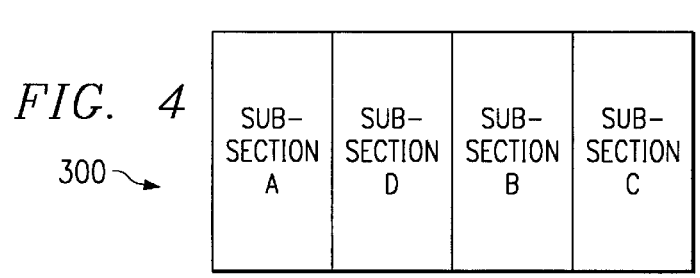
FIG. 4 is a block diagram illustrating a first technique for filling a section of the region of FIG. 2 according to a preferred embodiment of the invention.

Vertical Technique. According to the vertical technique, each common-width vertical section such as section 300 may be subdivided into n vertical subsections as shown in FIG. 4. Preferably, each of the vertical subsections will have equal width. N region fill processors may be used to fill the n vertical subsections simultaneously. By way of example, if the common-width sections are 128-pixels wide, and if 4 region fill processors are available in hardware, then preferably n would be 4 and each of the 4 vertical subsections would be 32 pixels wide. The inventors have discovered that, on some hardware, the order in which the available region fill processors are allocated to the vertical subsections can affect performance. For example, in the aforementioned Hewlett Packard Company graphics systems, 4 region fill processors A, B, C and D were available. Therefore, n was set equal to 4, and it was found empirically that the ADBC ordering shown in the drawing yielded the best performance for these systems. For different hardware, the optimum ordering of region fill processors may need to be redetermined.

Horizontal Technique. According to the horizontal technique, a determination may optionally be made as to whether the height of the vertical section to be filled exceeds a threshold height. If the section height is less than or equal to the threshold height, the section may optionally be filled according to the prior art technique shown in FIG. 1. But if the section's height exceeds the threshold height, further techniques to be described below may be employed to enhance performance. The threshold height may be determined empirically for a given hardware system. In the aforementioned Hewlett Packard Company graphics systems, the inventors hereof determined that the threshold height would be 32 pixels.

Similarly, the inventors have determined that for some hardware a threshold width exists. In particular, for a given section or rectangle height, different techniques according to the invention may yield better fill performance depending on whether or not the section's width exceeds the threshold width. The threshold width may be determined empirically for a given hardware system. In the aforementioned Hewlett Packard Company graphics systems, the inventors hereof determined that the threshold width would be 64 pixels.

In general, the vertical section to be filled may be divided into i+j horizontal subsections. The i horizontal subsections may be filled using i region fill processors in a first pass, and the j horizontal subsections may be filled using j region fill processors in a second pass. The determination of i and j will depend on the number of region fill processors available and on the height and width of the vertical section to be filled. The following discussion will assume that the height of the vertical section to be filled exceeds the threshold height. The discussion will also assume that four region fill processors are available, and that those processors may be used one, two, three or four at a time (as is the case with the hardware of the aforementioned Hewlett Packard Company graphics systems). The discussion will further assume the following definitions:

numWholeBlocks=the integer portion of (the height of the vertical section to be filled divided by the threshold height)

overlap=the height of the vertical section to be filled minus (numWholeBlocks times the threshold height)

numWholeBlocksDiv4=numWholeBlocks divided by 4 numWholeBlocksDiv3=numWholeBlocks divided by 3 numWholeBlocksMod4=numWholeBlocks mod 4 numWholeBlocksMod3=numWholeBlocks mod 3

In an embodiment, an "if, else-if" construct was used to determine the best choices for i and j depending on the height and width of the vertical section to be filled. The following pseudocode will help to illustrate such an embodiment. (Note: The pseudocode included below and the procedural descriptions included elsewhere herein are intended not only to suggest procedures for creating software embodiments of the invention, but also for creating hardware embodiments according to well-known techniques for converting behavioral descriptions of logic into digital systems.)

```
/* case 1 */
if    (numWholeBlocks is between 1 and 3)
{
       case_1();
}
/* case 2 */
else if (numWholeBlocks is 4) or
        (numWholeBlocks is a multiple of 4 AND sectionWidth is
        <widthThreshold)
{
       if    (overlap is less than or equal to half the threshold
              height) or
              (sectionWidth is less than widthThreshold)
       {
              case_2A();
       }
       else
       {
              case_2B();
       }
}
/* case 3 */
else if (numWholeBlocks is 5) or
        (numWholeBlocks mod 3 is 2 AND sectionWidth is
        >= widthThreshold)
{
       case_3();
}
/* case_4 */
else if (sectionWidth < widthThreshold)
{
       case_4();
}
       /* case 5 */
       else /* sectionWidth >= widthThreshold */
{
       case_5();
}
```

The above pseudocode will now be described case by case with reference to FIGS. 5–12.

Case 1: If numWholeBlocks is at least 1 but not more than 3, i is set equal to numWholeBlocks+1, and j is set equal to numWholeBlocks. FIGS. 5, 6 and 7 illustrate case 1 for numWholeBlocks equal to 1, 2 and 3, respectively. In the drawings, TH stands for threshold height, and OV stands for overlap. Preferably, in each of the subcases, the height of each of the i horizontal subsections is equal to overlap, and the height of each of the j horizontal subsections is equal to the threshold height minus overlap. It is further preferred that the i and j horizontal subsections be alternately interleaved, as shown. Such an interleaving facilitates the process of writing setup information to the region fill processors such that one setup may be written to the region fill processors to perform the first pass, and a second setup may be written to them to perform the second pass. Depending on the hardware, each setup may simply specify a height and width common to each horizontal subsection, a starting location for the first horizontal subsection, and an offset between the starting locations of the sections.

Case 2: Case 2 applies if numWholeBlocks is 4. It also applies if numWholeBlocks is a multiple of 4 and the width of the vertical section to be filled is less than the threshold width. Once it is determined that case 2 applies, a determination is made between two subcases (indicated above as cases 2A and 2B).

Case 2A applies if overlap is less than or equal to half of the threshold height or if the width of the vertical section to be filled is narrower than the threshold width. According to case 2A, i is set to 4 and j is set to 1. Preferably, the height of each of the i horizontal subsections is numWholeBlocksDiv4 times the threshold height, and the height of the j horizontal subsection is overlap. Preferably, the i horizontal subsections are arranged contiguously as shown in FIG. 8, and the j horizontal subsection may be located at the end of the i subsections or before them.

Case 2B applies if case 2A does not. According to case 2B, i is set to 3 and j is set to 2. Preferably, the height of each of the i horizontal subsections is overlap, and the height of each of the j horizontal subsections is:

(numWholeBlocksDiv4*2*the threshold height)−overlap.

Preferably, the i and j horizontal subsections are alternately interleaved as shown in FIG. 9.

Case 3: Case 3 applies if numWholeBlocks is 5. It also applies if numWholeBlocks is a multiple of 5 and the width of the vertical section to be filled is at least as wide as the threshold width. According to case 3, i is set to 3 and j is set to 2. Preferably, the height of each of the i horizontal subsections is:

(numWholeBlocksDiv3*the threshold height)+overlap;

and the height of each of the j horizontal subsections is:

the threshold height−overlap.

Preferably, the i and j horizontal subsections are alternately interleaved as shown in FIG. 10.

Case 4: If neither of cases 1, 2 or 3 apply, then case 4 will apply if the width of the vertical section to be filled is narrower than the threshold width. According to case 4, i is set to 4 and j is set to 3. Preferably, the height of each of the i horizontal subsections is:

$H_{i,case4}$=((numWholeBlocksDiv4+numWholeBlocksMod4−3)*the threshold height)+overlap;

and the height of each of the j horizontal subsections is:

$H_{j,case4}$=((4−numWholeBlocksMod4)*the threshold height)−overlap.

Preferably, the i and j horizontal subsections are alternately interleaved as shown in FIG. 11.

Case 5: If neither of cases 1, 2, 3 or 4 apply, then case 5 applies. According to case 5, i is set to 4 and j is set to 3. Preferably, the height of each of the i horizontal subsections is:

$H_{i,case5}$=(numWholeBlocksMod3* the threshold height)+overlap;

and the height of each of the j horizontal subsections is:

$H_{j,case5}$=(numWholeBlocksDiv3* the threshold height)−$H_{i,case5}$.

Preferably, the i and j horizontal subsections are alternately interleaved as shown in FIG. 12.

Preferred embodiments of the invention have been described herein by way of example and for purposes of illustration, not by way of limitation. Persons having skill in the art will readily appreciate that this description also suggests modified embodiments, and that such modified embodiments also fall within the scope of the appended claims. For example:

First, while the above detailed description of preferred embodiments has assumed the presence of 4 region fill processors in the hardware, the scope of the invention is not limited to such hardware. Rather, the invention may be beneficially employed with hardware having an arbitrary number of region fill processors.

Second, the techniques and algorithms described and claimed herein may be turned ninety degrees and employed with equal benefit. Thus, where the terms "vertical" and "horizontal" have been used in this document, including the claims, those terms are to be interpreted relative to one another and not relative to any absolute reference such as the top or bottom of a computer monitor.

Third, the techniques and algorithms described above have assumed for the purpose of illustration that the use of 3 versus 4 region fill processors should be favored when a region to be filled exceeds a threshold width. This assumption was illustrative of certain Hewlett Packard hardware identified hereinabove. But the invention as described and claimed herein may be employed beneficially on other hardware as well. The invention includes, for example, implementations that would favor the use of 4 versus 3 region fill processors for wide regions if it is empirically determined that such a choice would yield better performance on the host hardware.

Fourth, it should be noted that if the i horizontal subsections have a first common size and the j horizontal subsections have a second common size, then the hardware and setup of the region fill processors may be simplified. For example, the region fill processors may be designed so that several of them can be made to use common setup information. If so, then rather than writing a different region size or shape into setup registers for each of the region fill processors, a single region size or shape may be written along with a starting location and an offset. The region fill processors can then fill same-size regions in different locations of the same buffer or in different buffers altogether.

Furthermore, while the invention may be embodied in driver software, it may also be embodied in other software such as operating system software or application software. In some implementations, the invention may be embodied in hardware.

What is claimed is:

1. A method of filling a memory area representing a rectangle, comprising:
   dividing at least a first section of the rectangle into i+j horizontal subsections;
   filling the i horizontal subsections in a first pass using i region fill processors; and
   filling the j horizontal subsections in a second pass using j region fill processors.

2. The method of claim 1, wherein:
   the first section of the rectangle comprises the entire rectangle.

3. The method of claim 1, wherein:
   the first section of the rectangle does not comprise the entire rectangle.

4. The method of claim 3, further comprising:
   dividing at least a second section of the rectangle into n vertical subsections having equal width; and
   filling the n vertical subsections using n region fill processors.

5. The method of claim 4, wherein:
   a left edge of the second section is located at a 128-word aligned boundary.

6. The method of claim 1, where:
   the steps are performed only if the height of the first section exceeds a threshold height.

7. The method of claim 1, wherein:
   the i and j horizontal subsections do not overlap one another.

8. The method of claim 1:
where numWholeBlocks is defined as the integer portion of (the height of the first section divided by a threshold height); and
wherein if numWholeBlocks is at least 1 but not more than 3, then i is equal to numWholeBlocks+1 and j is equal to numWholeBlocks.

9. The method of claim 8:
where overlap is defined as the height of the first section minus (numWholeBlocks times the threshold height);
wherein the height of each of the i horizontal subsections is overlap; and
wherein the height of each of the j horizontal subsections is (the threshold height minus overlap).

10. The method of claim 9, wherein:
the i and j horizontal subsections are alternately interleaved.

11. The method of claim 1:
where numWholeBlocks is defined as the integer portion of (the height of the first section divided by a threshold height);
where overlap is defined as the height of the first section minus (numWholeBlocks times the threshold height); and
wherein if (numWholeBlocks is equal to 4) or if (numWholeBlocks is a multiple of four and the width of the first section is less than a threshold width), then the method further comprises: determining whether a first or a second condition is true, and if either the first or the second condition is true, i is equal to 4 and j is equal to 1, but if not, i is equal to 3 and j is equal to 2;
where the first condition is true if overlap is less than or equal to half the threshold height; and
where the second condition is true if the width of the first section is less than the threshold width.

12. The method of claim 11:
where numWholeBlocksDiv4 is defined as (numWholeBlocks divided by 4); and
wherein, when i is equal to 4 and j is equal to 1, the height of each of the i horizontal subsections is (numWholeBlocksDiv4 times the threshold height), and the height of the j horizontal subsection is overlap.

13. The method of claim 12 wherein, when i is equal to 4 and j is equal to 1:
the i horizontal subsections are contiguous with one another; and
the j horizontal subsection is located at the top or the bottom of the first section.

14. The method of claim 11:
where numWholeBlocksDiv4 is defined as (numWholeBlocks divided by 4); and
wherein, when i is equal to 3 and j is equal to 2, the height of each of the i horizontal subsections is overlap, and the height of each of the j horizontal subsections is ((numWholeBlocksDiv4 times twice the threshold height) minus overlap).

15. The method of claim 14, wherein, when i is equal to 3 and j is equal to 2:
the i and j horizontal subsections are alternately interleaved.

16. The method of claim 1:
where numWholeBlocks is defined as the integer portion of (the height of the first section divided by a threshold height); and
wherein if (numWholeBlocks is equal to 5) or if (numWholeBlocks mod 3 is equal to 2 and the width of the first section is greater than or equal to a threshold width), then i is equal to 3 and j is equal to 2.

17. The method of claim 16:
where numWholeBlocksDiv3 is defined as (numWholeBlocks divided by 3);
where overlap is defined as the height of the first section minus (numWholeBlocks times the threshold height); and
wherein, when i is equal to 3 and j is equal to 2, the height of each of the i horizontal subsections is ((numWholeBlocksDiv3 times the threshold height) plus overlap, and the height of each of the j horizontal subsections is (the threshold height minus overlap).

18. The method of claim 17 wherein, when i is equal to 3 and j is equal to 2:
the i and j horizontal subsections are alternately interleaved.

19. The method of claim 1, wherein:
if the width of the first section is less than a threshold width, then i is equal to 4 and j is equal to 3.

20. The method of claim 19:
where numWholeBlocksDiv4 is defined as (numWholeBlocks divided by 4);
where numWholeBlocksMod4 is defined as (numWholeBlocks mod 4);
where overlap is defined as the height of the first section minus (numWholeBlocks times the threshold height); and
wherein, when i is equal to 4 and j is equal to 3:
the height of each of the i horizontal subsections is ((numWholeBlocksDiv4 plus numWholeBlocksMod4 minus 3) times the threshold height) plus overlap; and
the height of each of the j horizontal subsections is ((4 minus numWholeBlocksMod4) times the threshold height) minus overlap.

21. The method of claim 20 wherein, when i is equal to 4 and j is equal to 3:
the i and j horizontal subsections are alternately interleaved.

22. The method of claim 1, wherein:
if the width of the first section is greater than or equal to a threshold width, then i is equal to 4 and j is equal to 3.

23. The method of claim 22:
where numWholeBlocksDiv3 is defined as (numWholeBlocks divided by 3);
where numWholeBlocksMod3 is defined as (numWholeBlocks mod 3);
where overlap is defined as the height of the first section minus (numWholeBlocks times the threshold height); and
wherein, when i is equal to 4 and j is equal to 3:
the height of each of the i horizontal subsections is (numWholeBlocksMod3 times the threshold height) plus overlap; and
the height of each of the j horizontal subsections is (numWholeBlocksDiv3 times the threshold height) minus the height of any one of the i horizontal subsections.

24. The method of claim 23 wherein, when i is equal to 4 and j is equal to 3:
the i and j horizontal subsections are alternately interleaved.

25. The method of claim 1, further comprising:
making a height determination whether the height of the first section exceeds a threshold height; and
setting the values of i and j responsive at least in part to the height determination.

26. The method of claim 1, further comprising:
making a width determination whether the width of the first section exceeds a threshold width; and
setting the values of i and j responsive at least in part to the width determination.

27. The method of claim 1, further comprising:
making a height determination whether the height of the first section exceeds a threshold height;
making a width determination whether the width of the first section exceeds a threshold width; and
setting the values of i and j responsive to both the height and the width determinations.

28. The method of claim 1, wherein:
all of the i horizontal subsections have a first common size; and
all of the j horizontal subsections have a second common size.

29. Program code embodied in a computer-readable storage or transmission medium that, when executed on a computer, causes the computer to perform a method of filling a memory area representing a rectangle, the method comprising:
dividing at least a first section of the rectangle into i+j horizontal subsections;
filling the i horizontal subsections in a first pass using i region fill processors; and
filling the j horizontal subsections in a second pass using j region fill processors.

30. The program code of claim 29, wherein:
the first section of the rectangle comprises the entire rectangle.

31. The program code of claim 29, wherein:
the first section of the rectangle does not comprise the entire rectangle.

32. The program code of claim 31, wherein the method further comprises:
dividing at least a second section of the rectangle into n vertical subsections having equal width; and
filling the n vertical subsections using n region fill processors.

33. The program code of claim 29, wherein the method further comprises:
making a height determination whether the height of the first section exceeds a threshold height; and
setting the values of i and j responsive at least in part to the height determination.

34. The program code of claim 29, wherein the method further comprises:
making a width determination whether the width of the first section exceeds a threshold width; and
setting the values of i and j responsive at least in part to the width determination.

35. The program code of claim 29, wherein the method further comprises:
making a height determination whether the height of the first section exceeds a threshold height;
making a width determination whether the width of the first section exceeds a threshold width; and
setting the values of i and j responsive to both the height and the width determinations.

36. The program code of claim 29, wherein:
all of the i horizontal subsections have a first common size; and
all of the j horizontal subsections have a second common size.

37. Apparatus for filling a memory area representing a rectangle, comprising:
logic for dividing at least a first section of the rectangle into i+j horizontal subsections;
logic for filling the i horizontal subsections in a first pass using i region fill processors; and
logic for filling the j horizontal subsections in a second pass using j region fill processors.

38. The apparatus of claim 37, wherein:
the first section of the rectangle comprises the entire rectangle.

39. The apparatus of claim 37, wherein:
the first section of the rectangle does not comprise the entire rectangle.

40. The apparatus of claim 39, further comprising:
logic for dividing at least a second section of the rectangle into n vertical subsections having equal width; and
logic for filling the n vertical subsections using n region fill processors.

41. The apparatus of claim 37, further comprising:
logic for making a height determination whether the height of the first section exceeds a threshold height; and
logic for setting the values of i and j responsive at least in part to the height determination.

42. The apparatus of claim 37, further comprising:
logic for making a width determination whether the width of the first section exceeds a threshold width; and
logic for setting the values of i and j responsive at least in part to the width determination.

43. The apparatus of claim 37, further comprising:
logic for making a height determination whether the height of the first section exceeds a threshold height;
logic for making a width determination whether the width of the first section exceeds a threshold width; and
logic for setting the values of i and j responsive to both the height and the width determinations.

44. The apparatus of claim 37, wherein:
all of the i horizontal subsections have a first common size; and
all of the j horizontal subsections have a second common size.

* * * * *